United States Patent
Kato

(10) Patent No.: US 8,109,137 B2
(45) Date of Patent: Feb. 7, 2012

(54) DEVICE FOR DETECTING CAM TOP POSITION OF HIGH PRESSURE PUMP

(75) Inventor: Kensho Kato, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 162 days.

(21) Appl. No.: 12/598,101

(22) PCT Filed: Sep. 25, 2008

(86) PCT No.: PCT/JP2008/067874
§ 371 (c)(1),
(2), (4) Date: Dec. 3, 2009

(87) PCT Pub. No.: WO2009/078210
PCT Pub. Date: Jun. 25, 2009

(65) Prior Publication Data
US 2010/0089137 A1    Apr. 15, 2010

(30) Foreign Application Priority Data
Dec. 14, 2007 (JP) .................................. 2007-323968

(51) Int. Cl.
*G01M 15/00* (2006.01)
(52) U.S. Cl. .................................................... 73/114.45
(58) Field of Classification Search ................ 73/114.45, 73/114.49, 114.63
See application file for complete search history.

(56) References Cited

U.S. PATENT DOCUMENTS

| | | | | |
|---|---|---|---|---|
| 4,338,813 A | * | 7/1982 | Hunninghaus et al. | .... 73/114.27 |
| 4,777,921 A | | 10/1988 | Miyaki et al. | |
| 5,094,216 A | * | 3/1992 | Miyaki et al. | ................ 123/506 |
| 5,197,438 A | * | 3/1993 | Kumano et al. | ............... 123/506 |
| 5,201,294 A | * | 4/1993 | Osuka | .......................... 123/458 |
| 5,277,156 A | * | 1/1994 | Osuka et al. | ........... 123/198 DB |
| 5,548,995 A | * | 8/1996 | Clinton et al. | ............. 73/114.63 |
| 5,732,679 A | * | 3/1998 | Takahasi et al. | .............. 123/467 |

(Continued)

FOREIGN PATENT DOCUMENTS

JP    59-192842    11/1984

(Continued)

OTHER PUBLICATIONS

International Search Report dated Dec. 16, 2008 for International Application No. PCT/JP2008/067874.

*Primary Examiner* — Freddie Kirkland, III
(74) *Attorney, Agent, or Firm* — Wenderoth, Lind & Ponack, L.L.P.

(57) ABSTRACT

A device detects the cam top position in an in-line type high pressure pump with a decreased amount of time required to detect the rotation position of the cam top position in an engine starting operation, thereby decreasing the time for starting an engine. A cam for driving a plunger has a plurality of cam lobes, and a plurality of cam top position pointers are attached to the outer periphery of the camshaft or to the outer periphery of a flywheel connected to the camshaft such that each of the pointers corresponds to each of the cam lobes of the cam in number and angle phase, respectively. A cam top position detector is located to face the pointers when the camshaft rotates so that the pointers are detected by the detector.

3 Claims, 3 Drawing Sheets

U.S. PATENT DOCUMENTS

| | | | |
|---|---|---|---|
| 6,079,381 A * | 6/2000 | Morikawa | 123/90.15 |
| 6,415,655 B2 * | 7/2002 | Loof et al. | 73/114.25 |
| 6,609,498 B2 * | 8/2003 | Mathews et al. | 123/406.62 |
| 7,201,124 B2 * | 4/2007 | Neubauer et al. | 123/90.17 |
| 7,267,106 B2 * | 9/2007 | Adachi et al. | 123/436 |
| 7,310,574 B2 * | 12/2007 | Di Cola et al. | 701/103 |
| 7,726,284 B2 * | 6/2010 | Hori | 123/501 |
| 2006/0153719 A1 | 7/2006 | Tanaka et al. | |

FOREIGN PATENT DOCUMENTS

| | | |
|---|---|---|
| JP | 61-46425 | 3/1986 |
| JP | 62-258160 | 11/1987 |
| JP | 1-100348 | 4/1989 |
| JP | 11-287147 | 10/1999 |
| JP | 2000-18052 | 1/2000 |
| JP | 2004-169640 | 6/2004 |

* cited by examiner (A)

(B)

DEVICE FOR DETECTING CAM TOP POSITION OF HIGH PRESSURE PUMP

TECHNICAL FIELD

The present invention relates to a device for detecting cam top position of a high pressure pump for pressurizing fuel to be accumulated in an accumulator (common rail) of an accumulator fuel injection system.

BACKGROUND ART

FIG. 3 is a diagrammatic longitudinal sectional view of a high pressure pump for an accumulator fuel injection system.

A high pressure pump 100 is connected to an engine (not shown) via a coupling 12 that is connected to a flywheel 11 connected to a camshaft 3 of the pump 100 to be driven by the engine.

The same number of cams 2 as that of cylinders of the engine is formed on the camshaft 3. Each cam 2 allows each plunger 1 to be reciprocated via each tappet 4 as the camshaft 3 rotates. Fuel pressurized to a high pressure by the plungers 1 is accumulated in an accumulator not shown in the drawing.

An electromagnetic valve 5 is provided above each of plunger rooms 1a of the high pressure pump 100. The electromagnetic valves 5 are connected via wiring 7 to a controller (ECU) 6 so that its closing-and-opening is controlled to control fuel supply to the accumulator and shutoff thereof.

To the controller (ECU) 6 is sent a detection signal of rotation position of the cam 2 from a cam top position detector 9 via wiring 8. A cam top position pointer 11a is attached on the circumference of the flywheel 11 at a position corresponding to the top of a cam lobe 21 of a far left cam 2, and a rotation position of the camshaft 3 when the cam top position detector 9 has detected the cam top position pointer 11a is determined as a reference cam top position.

A distribution type fuel pump is disclosed in patent literature 1 (Japanese Laid-Open patent Application No. 59-192842). According to the literature, rotation position of a rotation shaft is detected by a position detector by detecting a plurality of cam top position pointers attached to the circumference of the rotation shaft.

In the conventional high pressure pump for the accumulator fuel injection system as shown in FIG. 3, the detection signal of the cam top position pointer 11a detected by the cam top position detector 9 once per one rotation of the camshaft 3 is imputed to the controller (ECU) 6.

Discharge amount of fuel is controlled by controlling closing-and-opening of the electromagnetic valve 5. Discharge from the plunger room 1a begins and ends respectively when the electromagnetic valve 5 closes and opens the inlet port to the plunger room la. In order to control the timing of closing-and-opening of the electromagnetic valve 5, it is necessary to detect the reference cam top position. In the case of FIG. 3, the reference cam top position is detected once per one rotation of the camshaft 3. In an accumulator fuel injection system, fuel pressurized to a high pressure is accumulated in an accumulator and then injected from an injector according to electric signals sent to the injector, so there has been a problem that more time is required from the start of engine staring operation to the start of the engine as compared with a case of a conventional jerk fuel injection pump. As the discharge of fuel from the plunger room 1a to the accumulator is controlled by controlling closing-and-opening of the electromagnetic valve 5, rotation position of the cam top must be detected. However, since the rotation position of the reference cam top is detected once per one rotation of the camshaft, the time required to start the engine may further increase because the rotation speed of the camshaft is very slow at engine starting.

SUMMARY OF THE INVENTION

The present invention was made in light of the problems mentioned above, and the object of the invention is to provide a device for detecting the cam top position in an in-line type high pressure pump, with which time required to detect rotation position of the cam top position can be decreased in an engine starting operation, thereby the time for starting the engine can be decreased.

To attain the object, the present invention proposes a device for detecting cam top position of an in-line type high pressure pump having a camshaft for driving plungers to pressurize fuel to a high pressure to be accumulated in an accumulator, wherein a cam for driving a plunger has a plurality of cam lobes, a plurality of cam top position pointers are attached to the outer periphery of the camshaft or to the outer periphery of a flywheel connected to the camshaft such that each of the pointers corresponds to each of the cam lobes of the cam in the number and angle phase respectively, and a cam top position detector is located to face the pointers when the camshaft rotates so that the pointers are detected by the detector.

In the invention, it is preferable that;
(1) each of the pointers is a protrusion protruding from the outer periphery of the camshaft or flywheel, and
(2) each of the pointers is a depression on the outer periphery of the camshaft or flywheel.

According to the invention, each of the cams of a cam shaft is formed to have a plurality of cam lobes, so each cam have a plurality of cam tops, and a rotation position of the top of each cam lobe (rotation position of the cam top in crank angle of the engine) is detected by the cam top position detector, the cam top position is detected the-number-of-cam-lobes times per one rotation of the cam shaft. Therefore, the time interval of cam top detection is decreased to 1/(the number of the cam lobes) as compared with the case where the cam has one cam lobe, thereby time from the start of the engine starting operation to the beginning of controlling closing-and-opening of the electromagnetic valve can be decreased, and the time period required to start the engine is decreased as compared with the case of the conventional high pressure pump in an accumulator fuel injection system.

DETAILED DESCRIPTION OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
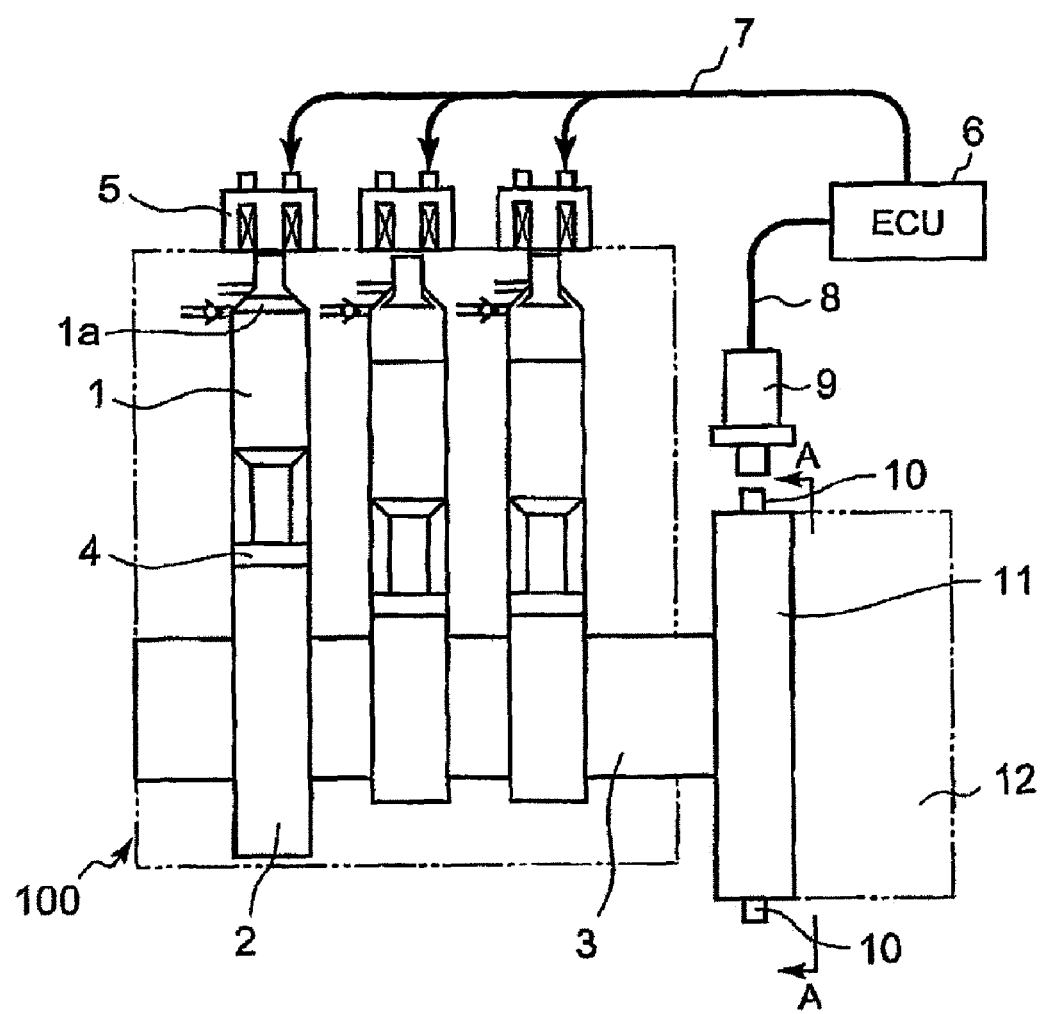
FIG. 1 is a diagrammatic longitudinal sectional view of the high pressure pump according to the invention in an accumulator fuel injection system.
Figure 2:
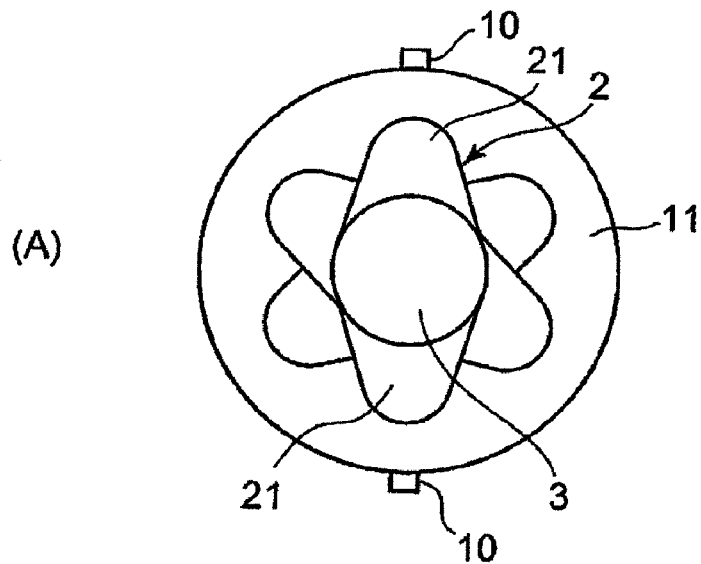
FIG. 2A is an embodiment showing a relation between the cam lobes and cam top position pointers.
FIG. 2B is another embodiment.
Figure 2:
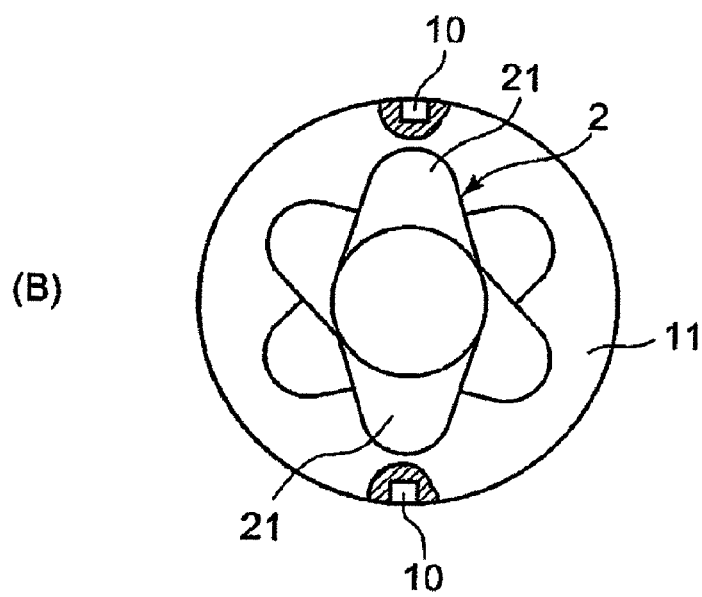
Figure 3:
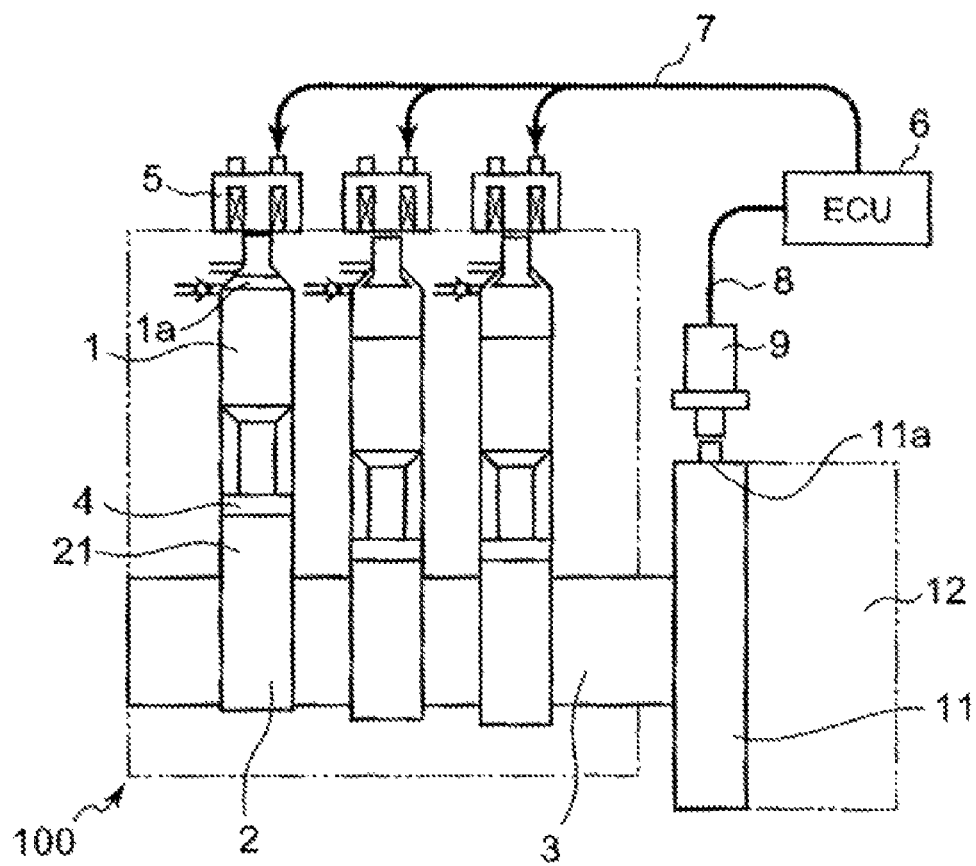
FIG. 3 is a diagrammatic longitudinal sectional view of a conventional high pressure pump.

FIG. 1 is a diagrammatic longitudinal sectional view of the high pressure pump according to the invention in an accumulator fuel injection system, FIG. 2A is an embodiment showing a relation between the cam lobes and cam top position pointers, and FIG. 2B is another embodiment.

In FIG. 1, a high pressure pump 100 has a camshaft 3 connected to a flywheel 11 which is connected via a coupling to an engine not shown in the drawing. The camshaft 3 has the same number of cams 2 as that of cylinders of the engine. Each plunger 1 is driven to reciprocate by each cam 2 via each tappet 4 as the camshaft 3 rotates. Fuel pressurized by the plunger 1 to a high pressure is accumulated in an accumulator (common rail) not shown in the drawing.

An electromagnetic valves 5 is located above each of plunger rooms 1a and connected via a wiring 7 to a controller (ECU) 6, and closing-and-opening timing of each electromagnetic valve 5 is controlled by the controller (ECU) 6, thereby controlling supply of fuel to the accumulator.

To the controller 6 is inputted the detection signal of the rotation position of the camshaft 3 detected by a cam top position detector 9 via-a wiring 8. The composition as mentioned above is the same as that of the conventional high pressure pump.

As shown in FIG. 2A, each cam 2 has two cam lobes 21 formed centrosymmetric to each other. Two cam top position pointers 10, 10 are provided on the outer periphery of the flywheel 11 corresponding in their phases respectively to the tops of the two cam lobes.

In other words, two cam lobes 21, 21 are formed with a phase difference of 180° and each of two pointers 10, 10 are fixed to the outer periphery of the flywheel 11 respectively at a position corresponding to the apex (cam top) of each of the cam lobes 21, 21. When a cam 2 has three lobes, three cam top position pointers will be fixed to the outer periphery of the flywheel 11 at three positions corresponding respectively to the apexes of the cam lobes with an angular interval of 120°.

Detection signals of the pointers 10, 10 by the cam top position detector 9 when each of the cam top position pointers 10, 10 has come under the detector 9 are inputted to the controller 6.

Each of the cam top position pointers 10 is formed as a protrusion protruding from the outer periphery of the flywheel 11 as shown in FIG. 2A or as a depression-type cam top position pointer 10 as shown in FIG. 2B.

When adopting the depressions as cam top position pointers, the depressions can be easily formed by drilling holes on the outer periphery of the flywheel 11, and further, as the cam top position detector 9 can be located nearer to the outer periphery of the flywheel 11 as compared with the case of protruded pointers, the device can be composed smaller in size.

By forming two cam lobes 21 on one cam 2 and providing a two cam top position pointers on the outer periphery of the flywheel corresponding to a plurality of the cam lobes with the same angle phase respectively, two cam top positions can be detected per one rotation of the camshaft 3. Therefore, the cam top position detection interval can be decreased to ½ as compared with the case of the conventional pump in which the cam top detection signal is received once per one rotation of the camshaft.

When the number of the cam lobes formed on one cam is n, the cam top position detection interval can be decreased to 1/n as compared with the conventional case in which one cam has one cam lobe. Therefore, the time period required from the start of the engine starting operation to the beginning of controlling closing-and-opening of the electromagnetic valve can be decreased, thus the time period required to start the engine is decreased as compared with the case of the conventional high pressure pump in an accumulator fuel injection system.

As to detection of cam top positions of other cams, it is suitable to provide on the outer periphery of the flywheel 11 cam top position pointers corresponding in number and phase to the tops of cam lobes of other cams respectively, or it is also suitable to calculate cam top positions of cam lobes of other cams based on the detection signal of the top positions of one of the cams.

In the embodiment shown in FIG. 1, the cam top position pointers 10 are attached to the outer periphery of the flywheel 11. However, it is suitable to attach the pointers to the outer periphery of the camshaft 3.

Industrial Applicability

According to the invention, a device for detecting the cam top position of a high pressure pump used in an accumulator fuel injection system can be provided, with which the time period required from the start of engine starting operation to the beginning of controlling closing-and-opening of the electromagnetic valve can be decreased, and the time period required to start engine is decreased as compared with the case of the conventional high pressure pump in an accumulator fuel injection system.

The invention claimed is:

1. A device for detecting cam top position of an in-line type high pressure pump having a camshaft for driving a plurality of plungers to pressurize fuel to a high pressure to be accumulated in an accumulator, the device comprising:
    a plurality of cams formed on the camshaft for driving the plurality of plungers;
    a plurality of cam lobes provided to each of the plurality of cams;
    a flywheel provided to the camshaft; and
    a plurality of cam top position pointers attached to an outer periphery of the camshaft or to an outer periphery of the flywheel, wherein
    the plurality of cam top position pointers correspond to the cam lobes of one of the plurality of cams in number and angle phase, and
    a cam top position detector is located to face the cam top position pointers when the camshaft rotates so that the cam top position pointers are detected by the cam top position detector.

2. The device as claimed in claim 1, wherein each of the cam top position pointers is a protrusion protruding from the outer periphery of the camshaft or flywheel.

3. The device as claimed in claim 1, wherein each of the cam top position pointers is a depression on the outer periphery of the camshaft or flywheel.

\* \* \* \* \*